(12) United States Patent
Chien

(10) Patent No.: US 7,133,965 B2
(45) Date of Patent: Nov. 7, 2006

(54) RAID STORAGE DEVICE

(75) Inventor: Hung Ming Chien, Hsinchu (TW)

(73) Assignee: Promise Technology, Inc., Hsin-Chu (TW)

( * ) Notice: Subject to any disclaimer, the term of this patent is extended or adjusted under 35 U.S.C. 154(b) by 467 days.

(21) Appl. No.: 10/708,177

(22) Filed: Feb. 13, 2004

(65) Prior Publication Data

US 2005/0132134 A1 Jun. 16, 2005

(30) Foreign Application Priority Data

Dec. 15, 2003 (TW) .............................. 92135338 A

(51) Int. Cl.
*G06F 12/08* (2006.01)

(52) U.S. Cl. .................... 711/114; 711/104; 711/165; 711/203; 714/6; 714/20; 714/770; 709/203; 709/223

(58) Field of Classification Search ................ 711/104, 711/114, 162, 165, 172, 203; 714/6, 20, 714/770; 709/203, 214, 223
See application file for complete search history.

(56) References Cited

FOREIGN PATENT DOCUMENTS

JP 0878756 A2 * 2/1998

* cited by examiner

*Primary Examiner*—Pierre Bataille
*Assistant Examiner*—Chase Peers
(74) *Attorney, Agent, or Firm*—Jiang Chyun IP Office

(57) ABSTRACT

An redundant array of independent disks (RAID) storage device is provided. The RAID comprises M number of storage devices, and the storage blocks of the same J-column in each storage device comprises complete stripe blocks and at least a plurality of partially complete stripe blocks. Inside the same stripe block, the total number of the storage blocks (L) is smaller than the number of the storage device (M), and the quantity of the storage blocks (M) is not multiple of storage blocks (L).

10 Claims, 7 Drawing Sheets

US 7,133,965 B2

RAID STORAGE DEVICE

CROSS REFERENCE TO RELATED APPLICATIONS

This application claims the priority benefit of Taiwan application serial no. 92135338, filed Dec. 15, 2003.

BACKGROUND OF INVENTION

1. Field of the Invention

The present invention relates to a data storage device, and more particularly, to a redundant array of independent disks (RAID) storage device.

2. Description of the Related Art

In a storage system comprising multiple disk arrays, the redundant array of independent disks (abbreviated as RAID hereinafter) is a technique which integrates several small size physical disks to form an extendable logical drive. When storing a data, the data is split into several data blocks and each data block is stored in a separate physical disk. Since the access operation is performed simultaneously, better data access efficiency is provided by the RAID technique. In addition, in order to prevent the data loss due to some physical disk damage, the RAID technique also applies the parity check concept for rebuilding data when it is necessary.

In general, the RAID system is classified as several levels based on the RAID type of the physical disk and the way it stores data, and the commonly seen RAID system on the current market comprises following types.

RAID 0, in which a data is split into several blocks, and each block is written into a separate physical disk (it is the so-called "Data stripping"). Thus the RAID 0 provides better access efficiency. However, since the RAID 0 does not support fault tolerance and data rebuild, if one of the physical disks fails, the data is lost. Therefore, it is only suitable for the circumstance where the data which is not so important needs to be accessed in a high speed.

RAID 1, in which two physical disks are treated as a logical drive, and the data is stored into two physical disks simultaneously. When one of the physical disks is damaged, the same data can be accessed from the other physical disk so as to prevent the important data from being lost.

RAID 3, in which a physical disk is reserved as a parity disk for storing parity data, and other data is evenly stored in other physical disks. When some physical disk is damaged, the disk controller can recover the data by using the parity data stored previously.

RAID 5, is different from RAID 3 in that the parity data is distributed and saved in each physical disk without having to allocate a dedicated parity disk. Thus, the RAID 5 is also known as a "Rotating Parity Array". Wherein, the data is evenly stored in each physical disk like in RAID 3. When one of the physical disks is damaged, the disk controller can recover the data by using the parity data stored previously.

The RAID 0 mentioned above is advantageous in supporting fast access, and the RAID 1, RAID 3, and RAID 5 are advantageous in supporting fault tolerance and data rebuild. If we combine the RAID storing type as RAID 0+RAID 1 (represented as RAID 10), both advantages will be achieved. Of course, other combination such as RAID 0+RAID 3 (represented as RAID 30) or RAID 0+RAID 5 (represented as RAID 50) are also valid.

In addition, although the RAID 1, RAID 3, and RAID 5 support the fault tolerance and data rebuild. However, these functions are supported when only one physical disk is damaged. If more than one physical disk are damaged, the data cannot be rebuilt. Therefore, in another type of the RAID combination in conventional art, a distributed parity data is generated in the storage blocks of the same column of stripes in each physical disk in order to rebuild data when more than one physical disk are damaged.

FIG. 1 is a structure diagram of a conventional RAID 3 combination style disk array. The RAID disk array 100 comprises M storage devices 110, and each storage devices 110 comprises N storage blocks 112. Wherein, the storage blocks of the same J-column comprise a plurality of physical data blocks and at least a parity data block. The parity data block is obtained from the calculation based on the physical data blocks. For example, the parity data block of the first column 112p is obtained from the calculation based on the physical data blocks 112a, 112b, 112c, 212d, and the rest can be deduced by analogy. Herein, it is defined that $D_J$ is a quantity of the physical data blocks in the same J-column stripe, and $P_J$ is a quantity of the parity data blocks in the same J-column stripe. Wherein, $D_J + P_J = M$. Moreover, N, M, J are positive integers, and J is an integer of 1~N.

In addition, FIG. 2 is a structure diagram of a conventional RAID 50 combination style multi-disk array. The RAID disk array 200 comprises M number of first storage devices 210 and M number of second storage devices 220. Wherein, the physical data blocks 212a, 212b, 214a, 214b are disposed with the RAID 0 combination style first, and the data blocks 212a, 212b, 214a, 214b are then saved in the stripes of the first storage device 210 and the second storage device 220, respectively. Herein, the parity data block 212p is obtained from the calculation based on the physical data blocks 212a, 212b, the parity data block 214p is obtained from the calculation based on the physical data blocks 214a, 214b, and the rest can be deduced by analogy.

In the conventional art, it is required to increase the quantity of the first storage device 210 and the second storage device 220 in order to increase the storage capacity. However, each time when a first storage device 210 is added, a corresponding second storage device 220 has to be added accordingly. Therefore, the expansion of the system capacity is limited. In addition, since it has to follow the existing RAID 5 combination arrangement architecture for expanding the capacity, the system access efficiency cannot be effectively improved.

SUMMARY OF INVENTION

Therefore, it is an object of the present invention to provide a redundant array of independent disks (RAID) storage device, which supports a new data storing method rather than the existing RAID combination style for improving the system access efficiency, and the RAID storage device is also advantageous in supporting fault tolerance and data rebuild.

It is another object of the present invention to provide a RAID expansion method. With this method, the quantity of the storage devices is not limited by the existing RAID combination architecture.

In accordance with the above objects, a RAID storage device is provided by the present invention. It is assumed that the RAID is composed of L number of virtual disks, and the virtual disks comprise a plurality of stripes. Wherein, the quantity of the blocks in each stripe is equal to the quantity of the virtual disks. An index, which is referred as a "block index", is assigned to each block. The RAID storage device at least comprises M number of storage devices comprising a plurality of blocks. Wherein, M, L are positive integers, M>L, and M is not integral of L. When the blocks of the virtual disks are distributed in the storage devices, another index, which is referred as a "position index", is assigned to the block in each storage device, and the position index is a mapping function of the block index.

In accordance with the above objects, a RAID storage device is provided by the present invention. The RAID storage device comprises M number of storage devices, and each storage device comprises N number of storage blocks. The storage blocks in the same J-column in the storage devices comprises a plurality of complete stripe blocks, and each complete strip block comprises L number of storage blocks, wherein, N, M, L are positive integers, L<M, and M is not integral of L at least a plurality of partially complete stripe blocks.

In accordance with a preferred embodiment of the present invention, each stripe mentioned above, for example, comprises at least a first physical data block and at least a first parity data block, and the first parity data block is obtained from the calculation based on the first physical data block. In addition, the partially complete stripe blocks, for example, comprises at least a second physical data block or at least a second parity data block.

A new RAID combination architecture is adopted by the RAID disk array of the present invention, with such new RAID combination architecture, the manner of storing data is not limited by the existing RAID combination architecture, and its advantages of supporting fault tolerance and data rebuild are achieved. In addition, the expansion of the storage capacity of the storage devices is not limited by the existing RAID combination architecture. Accordingly, the present invention provides a new RAID combination architecture.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

Figure 1:
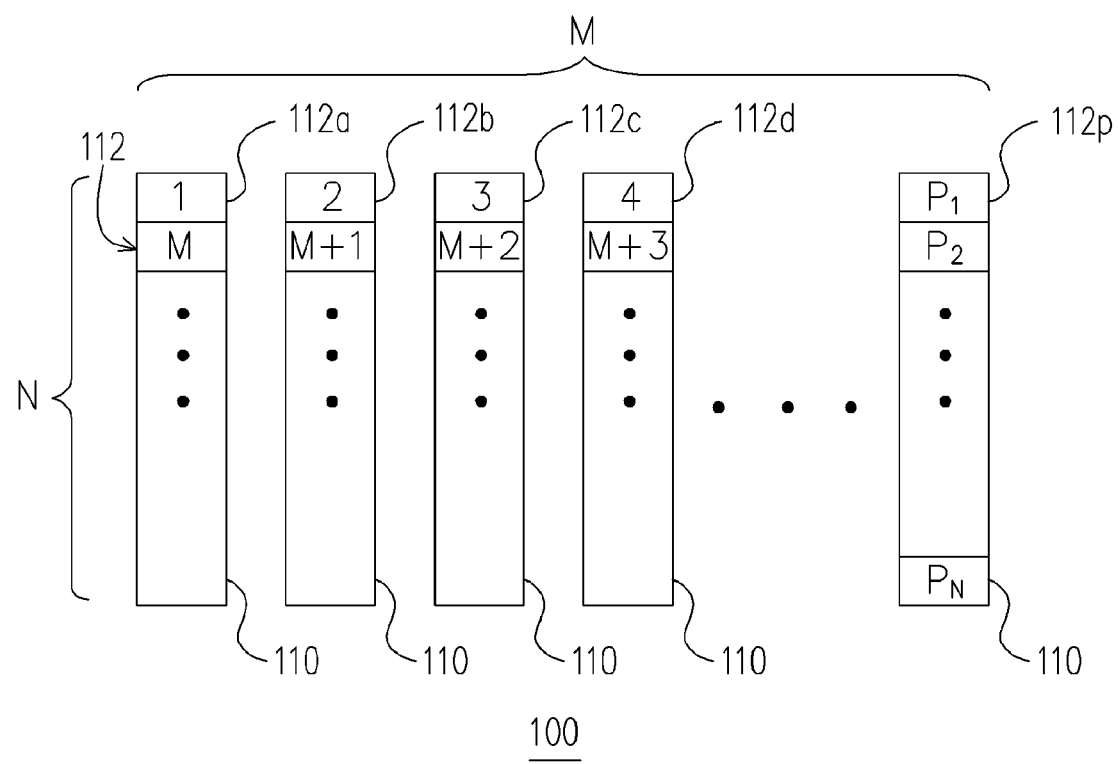
FIG. 1 is a schematic block diagram of a conventional RAID 3 combination disk array architecture.
Figure 2:
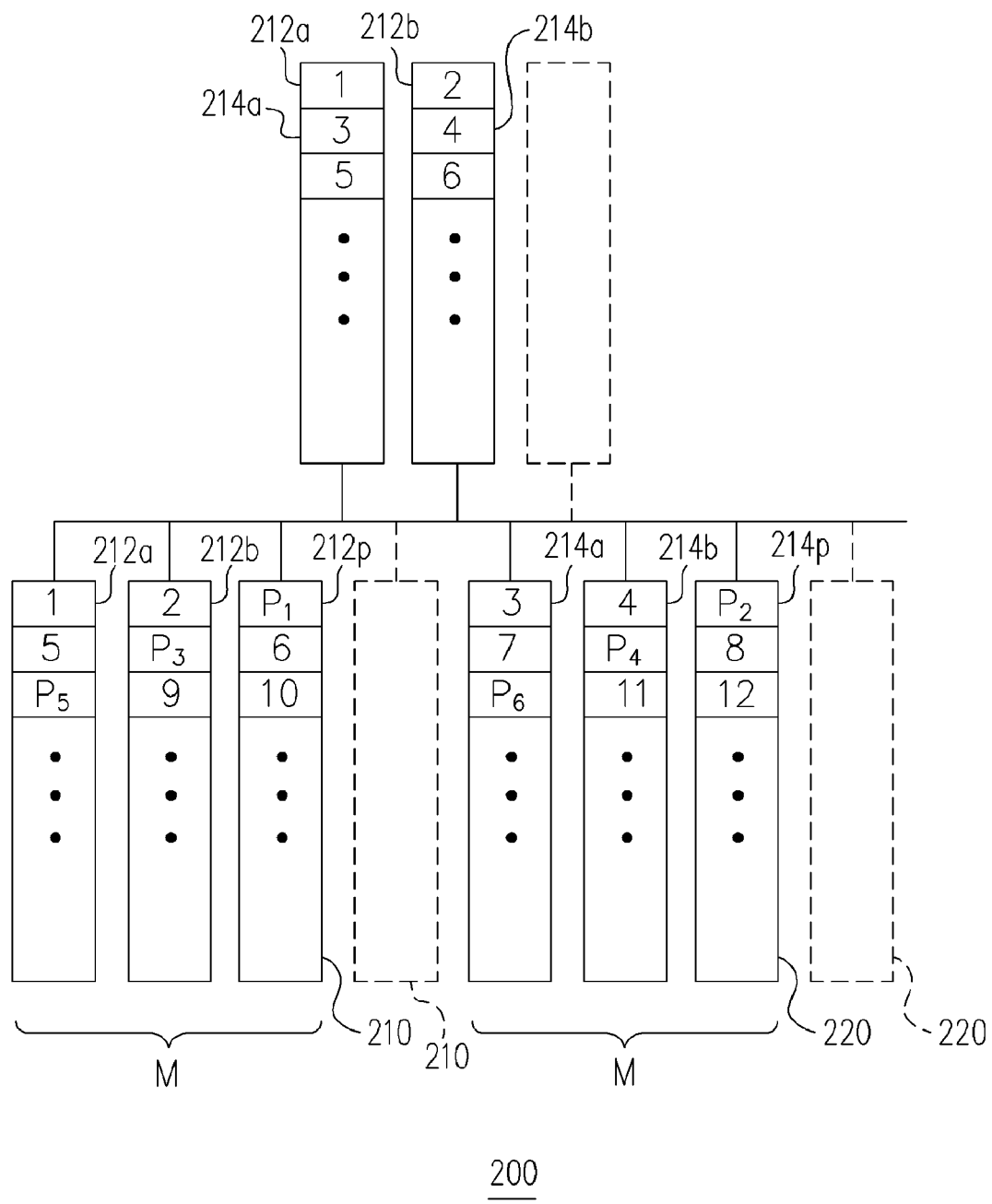
FIG. 2 is a schematic block diagram of a conventional RAID 50 combination multi-disk array architecture.
Figure 3:
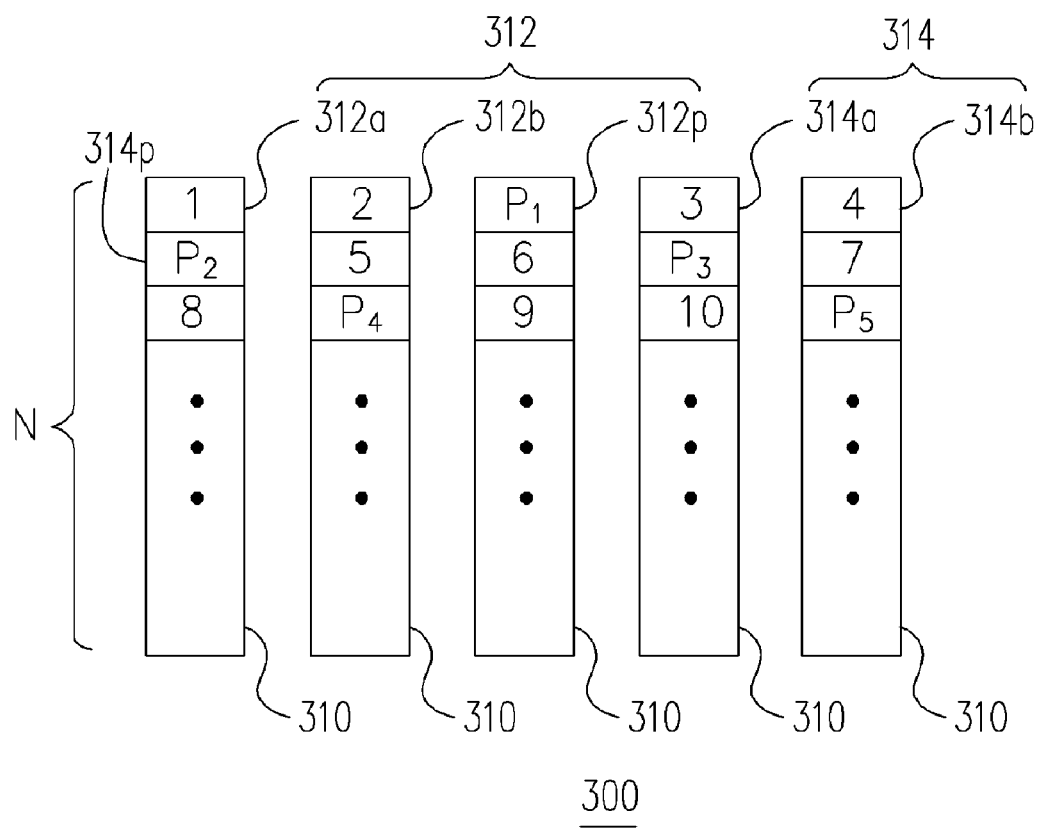
FIG. 3 is a schematic block diagram illustrating a RAID storage device according to a preferred embodiment of the present invention.

FIG. 3 is a schematic block diagram illustrating a RAID storage device according to a preferred embodiment of the present invention. The RAID disk array 300, for example, comprises five (5) storage devices 310, and each storage device 310 comprises N number of storage blocks 312. The storage blocks 312, for example, is composed of a plurality of physical data blocks 312a, 312b and a parity data block 312p. Wherein, the parity data block 312p is a block belonging to the same stripe and obtained from the calculation based on the physical data blocks 312a, 312b. In addition, the storage block 314, for example, is composed of a plurality of physical data blocks 314a, 314b and a parity data block 314p. Wherein, the parity data block 314p is a block belonging to the same stripe and obtained from the calculation based on the physical data blocks 314a, 314b. It is to be emphasized that in the present embodiment, the parity data block 314p is stored in the storage device 310 which is different from the storage device where the physical data blocks 314a, 314b are stored, so that when one storage devices 310 is damaged, the disk controller (not shown) can recover the physical data blocks 314a, 314b with the parity data block 314p stored previously. However, the difference between the present invention and the conventional art is that the parity data block 3 14p is disposed in the storage block which is not in the same column of the storage block where the physical data blocks 314a, 314b are stored, and other data blocks (5, 6, P3, 7, 8, P4, . . . ) are disposed on different storage blocks based on its arrangement sequence. Therefore, compared to the conventional RAID 3 or RAID 5 combination style, the parity data blocks (P1, P2, . . . , Px) in the arrangement mentioned above is not limited to be disposed on the same storage device as in the RAID 3 combination architecture, or limited to be disposed in different storage devices based on its written sequence as in the RAID 5 combination architecture. Therefore, in the present embodiment, the combination architecture of the RAID disk array 300 is not limited by the arrangement of the conventional RAID 3 and RAID 5, and its advantages of supporting fault tolerance and data rebuild can be maintained.

Therefore, the RAID disk array of the RAID combination architecture mentioned above is described as follows.

It is assumed that the storage device 310 comprises M number of storage devices, and the storage blocks of the same J-column comprise a plurality of complete stripe blocks and at least a partially complete of the stripe blocks, wherein a complete stripe block is considered to be fully composed of storage blocks and a partially complete stripe block is considered have smaller number of storage blocks compared to the complete stripe block. Wherein, each stripe block comprises L number of storage blocks, M, L are positive integers, L<M, and M is not multiple of L.

FIG. 3 is exemplified herein for explanation, it is assumed that $D_J$ is a quantity of the physical data blocks 312a, 312b belonging to the same stripe in the storage blocks of the same J-column, and $P_J$ is a quantity of the parity data block 312p belonging to the same stripe in the storage blocks of the same J-column, thus $D_J+P_J<M$, and M is not multiple of $D_J+P_J$. In addition, the partially complete stripe blocks, for example, are the physical data blocks 314a, 314b or the parity data blocks 314p.

Figure 3A:
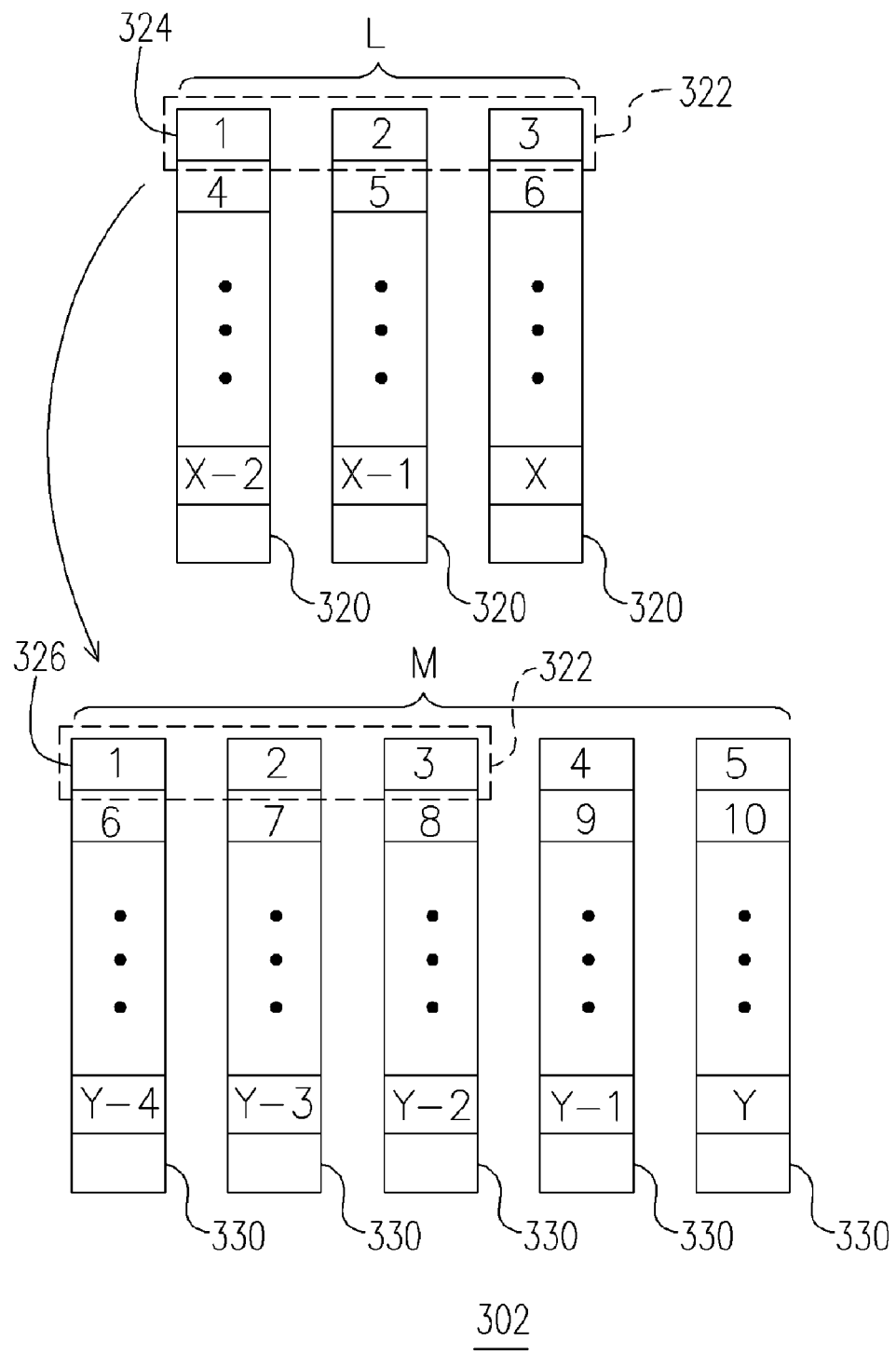
FIG. 3A is a schematic block diagram illustrating a RAID storage device according to a preferred embodiment of the present invention.

On the other hand, referring to FIG. 3A, a schematic block diagram illustrating a RAID storage device according to a preferred embodiment of the present invention is shown. It is assumed that the RAID disk array 302 comprises L number of virtual disks 320, and the virtual disks 320 comprises a plurality of stripes 322. Wherein, the number of the blocks in each stripe 322 is equal to the number of the virtual disks 320. An index, which is referred as a "block index", is assigned to each block 324 (e.g. in an ascending order or a descending order). Then, the blocks 324 in the virtual disk 320 are mapped to the M storage devices 330 (e.g. the physical disks). Wherein, M, L are positive integers, M>L, and M is not multiple of L. Another index, which is referred as a "position index", is assigned to the block 326 in each storage device 330 (e.g. in an ascending order or a descending order). Wherein, the position index is a mapping function of the block index. In other words, the $Y^{th}$ block in the storage device 330 is represented as the mapping function value of the $X^{th}$ block in the virtual disk 320, i.e. Y=mapping function (X). Wherein, the mapping function is a one-to-one function, for example, a simple identity function, i.e. Y=X, and the mapping function also can be other complex equations. It will be apparent to one of the ordinary skill in the art that modifications to the mapping function of the present invention for designing the RAID disk array with different arrangement may be made without departing from the spirit of the invention.

Figure 4:
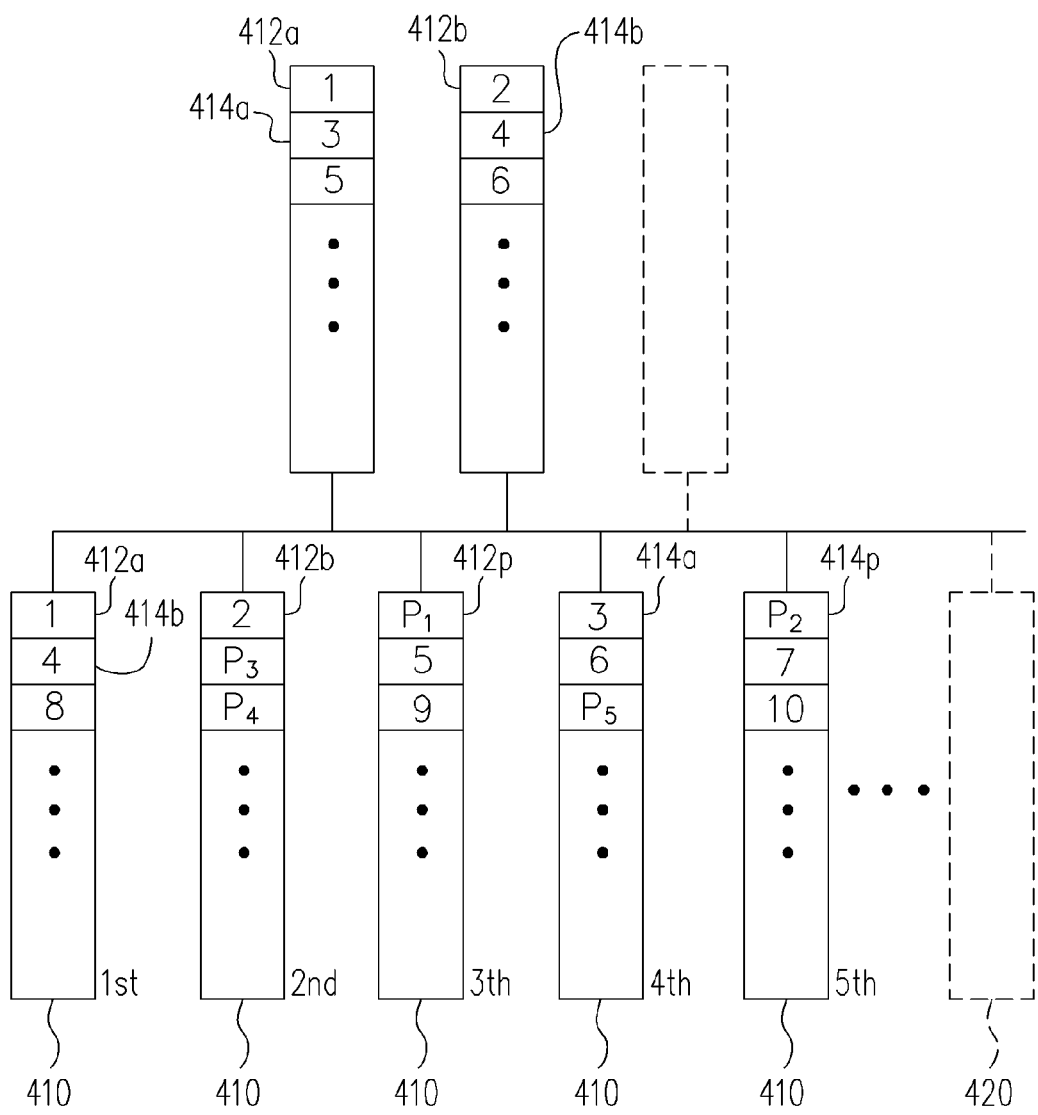
FIG. 4 is a schematic block diagram illustrating a RAID storage device according to a preferred embodiment of the present invention.

FIG. 4 is a schematic block diagram illustrating a RAID storage device according to a preferred embodiment of the present invention. With the arrangement of the present embodiment, the combination architecture of the conventional RAID 50 (or RAID 30) is slightly modified. For example, the physical data blocks 412a, 412b are disposed with the RAID 0 combination architecture first (in virtual disk), then the physical data blocks 412a, 412b are stored in a first storage device 410 and a second storage device 410, respectively, and a parity data block 412p is generated in a third storage device 410. In addition, the physical data block 414a and the parity data block 414p are stored in a $4^{th}$ storage device and a $5^{th}$ storage device, respectively. The parity data block 414p is obtained from the calculation based on the physical data blocks 414a, 414b, and the rest can be deduced by analogy.

It is to be emphasized that in the present embodiment, the data does not belong to the existing RAID 5 combination architecture, instead it is a new combination architecture. It is advantageous because it is not necessary to add the same quantity of the storage devices 420 to each storage system as in the conventional RAID 5 (or RAID 3) combination architecture when expanding one or more storage devices 420. Therefore, the storing method of the present invention is not limited by the extent of the expansion of the system capacity.

The present invention is also advantageous in improving the data access efficiency of the system. FIG. 3 is exemplified herein for explanation, when the system writes data into a physical data block 312a of the storage block 312, the system reads a physical data block 312b and writes a parity data block 312p, that is, the system only has to perform the writing operation two times and the reading operation one time. However, with the same amount of the storage device, if the conventional RAID 5 or RAID 3 combination architecture is used, for writing data into a physical data block 312a, the system has to read other three physical data blocks in the same column, and write a parity data block, that is, the system has to perform the writing operation two times and the reading operation three times. Accordingly, with the same amount of the storage device, the system with new combination architecture provides better access efficiency than the conventional RAID 5 or RAID 3. As calculated in the present embodiment, the improvement of the access efficiency is up to 66%.

Figure 5:
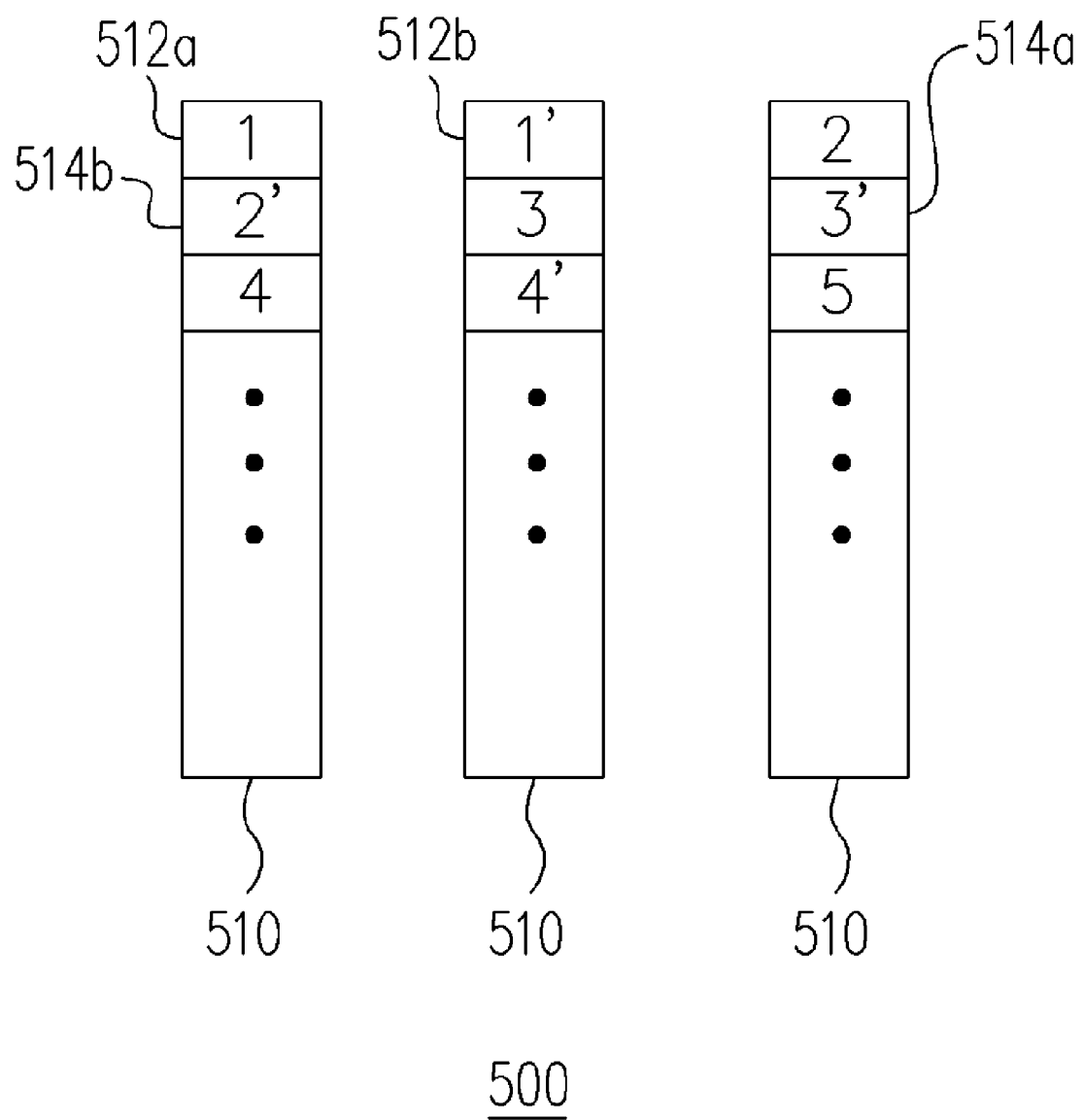
FIG. 5 is a schematic block diagram illustrating a RAID storage device according to another preferred embodiment of the present invention.

FIG. 5 is a schematic block diagram illustrating a RAID storage device according to another preferred embodiment of the present invention. The conventional RAID 1 combination style storage device comprises an even number of the storage devices, and the same data block is stored in a pair of the storage devices, respectively. However, the RAID disk array 500 of the present embodiment comprises an odd number of the storage devices 510. The paired same data blocks 512a, 512b are stored in different storage device 510, respectively, the other paired same data blocks 514a, 514b are stored in different storage device 510, respectively, and the rest can be deduced by analogy. However, it is different from the conventional RAID 1 combination architecture in that the number of the storage device 510 is not limited by the paired same data blocks for being an even number, and its advantages of supporting the fault tolerance and data rebuild is maintained. In addition, with the same reason, the system with such new combination architecture provides better access efficiency than the conventional RAID 1. As calculated in the present embodiment, the improvement of the access efficiency is up to 50%.

Figure 6:
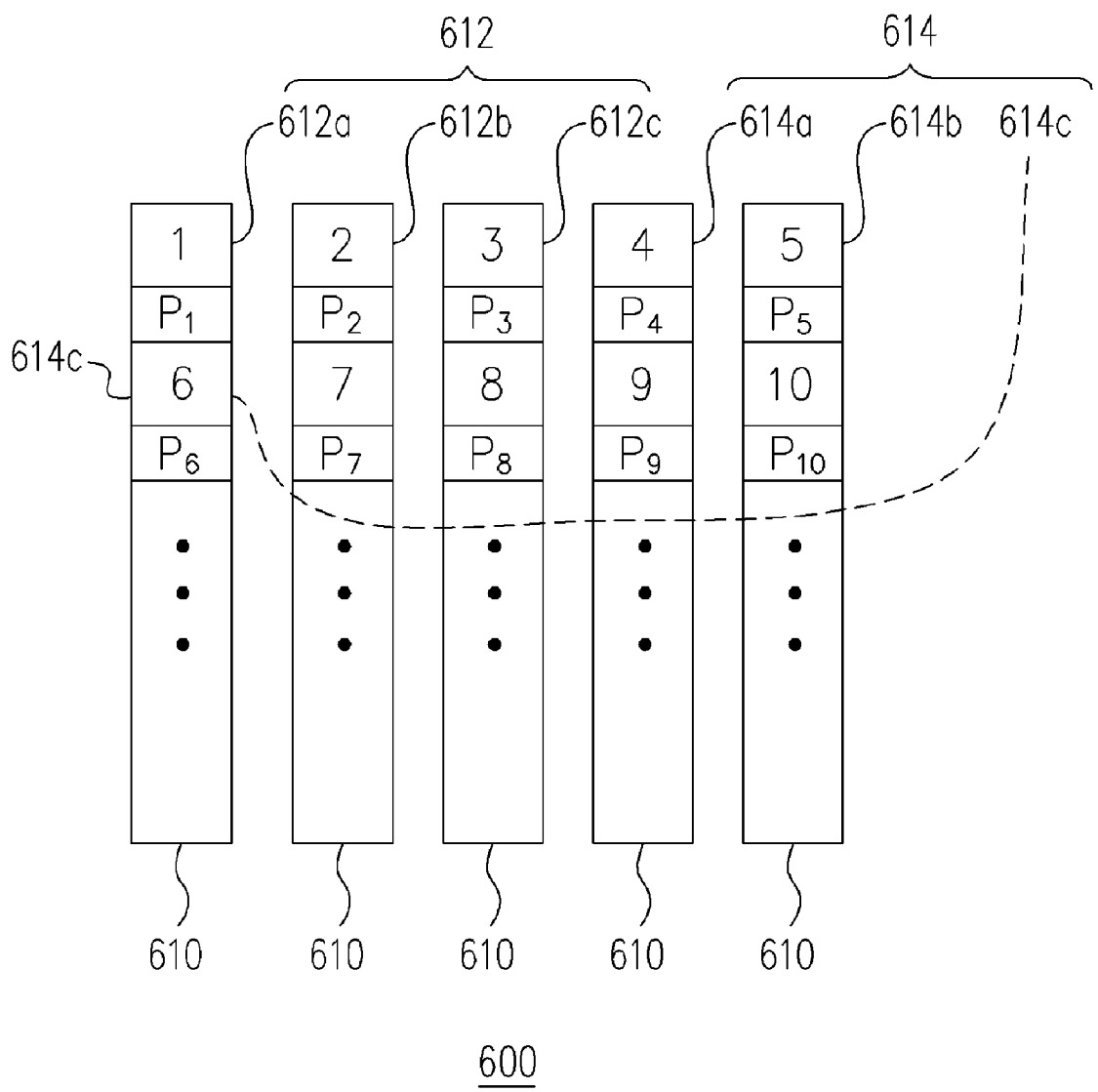
FIG. 6 is a schematic block diagram illustrating a RAID storage device according to another preferred embodiment of the present invention.

FIG. 6 is a schematic block diagram illustrating a RAID 600 storage device according to another preferred embodiment of the present invention. The physical data blocks 612a, 612b, 612c and its distributed parity data blocks P1, P2, P3 in the storage block 612 are disposed in different storage device 610, respectively, such that it is assured that the data can be rebuilt when more than one storage device 610 is damaged. In addition, in the present embodiment, the number of the storage device 610 is not multiple of the quantity of the physical data blocks in the same stripe. Therefore, the physical data blocks 614a, 614b, 614c and its distributed parity data blocks P4, P5, P6 in the same stripe can be disposed on the storage blocks of different columns, and the rest can be deduced by analogy. Similarly, the data can be rebuilt when more than one storage device 610 is damaged.

In summary, the RAID storage device provided by the present invention comprises a plurality of storage devices, wherein in the storage blocks of the same j-column, the total number of the quantity of the physical data blocks and the number of the parity data blocks in the same stripe ($D_j+P_j$) is smaller than the number of the storage devices (M), and M is not multiple of $D_j+P_j$. Therefore, the data storing method is not limited by the existing RAID combination architecture, such that the access efficiency is improved, and its advantage of supporting fault tolerance and data rebuild is maintained. In addition, the expansion quantity of the storage device is not limited by the existing RAID combination style.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

The invention claimed is:

1. An redundant array of independent disks (RAID) storage device, comprising L number of virtual disks having a plurality of stripes with each strip having a plurality of blocks, wherein a number of the blocks in each stripe is equal to a number of the virtual disks, and a block index, assigned to each block, the RAID storage device comprising:

M number of storage devices comprising a plurality of blocks, wherein, M, L are positive integers, M>L, and M is not multiple of L, when the blocks of the virtual disks are distributed in the storage devices, a "position index" is assigned to the block in each storage device, and the position index is a mapping function of the block index.

2. The RAID storage device of claim 1, wherein the storage devices comprises a plurality of physical disks.

3. A redundant array of independent disks (RAID) storage device, comprising:

M number of storage devices each comprising N number of storage blocks, and the storage blocks of the same J-column in the storage devices comprising:

a plurality of complete stripe blocks, each comprising L number of storage blocks, wherein, N, M, L are positive integers, L<M, and M is not multiple of L; and at least a plurality partially complete stripe blocks.

4. The RAID storage device of claim 3, wherein each stripe block comprises at least a first physical data block and at least a first parity data block, and the first parity data block is obtained from the calculation based on the first physical data block.

5. The RAID storage device of claim 3, wherein the partially complete stripe blocks comprises at least a second physical data block.

6. The RAID storage device of claim 3, wherein the partially complete stripe blocks comprises at least a second parity data block.

7. The RAID storage device of claim 3, wherein the storage devices comprises a plurality of physical disks.

8. A redundant array of independent disks (RAID) storage device, comprising:

M number of storage devices, each comprising N number of storage blocks, and the storage blocks of the same J-column in the storage devices comprising:

a plurality of complete stripe blocks comprising L number of first physical data blocks, wherein, M, N, J are positive integers, J is a positive integer of 1~N, L<M, and M is not multiple of L; and at least a plurality partially complete stripe blocks.

9. The RAID storage device of claim 8, wherein the partially complete stripe blocks comprises at least a second physical data block.

10. The RAID storage device of claim 8, wherein the storage devices comprises a plurality of physical disks.

* * * * *